June 17, 1969  B. HURKO  3,450,861

BROILING OVEN WITH TILTING HEATING MEANS

Filed Sept. 21, 1967

INVENTOR.
BOHDAN HURKO
BY Richard L. Caelin
HIS ATTORNEY

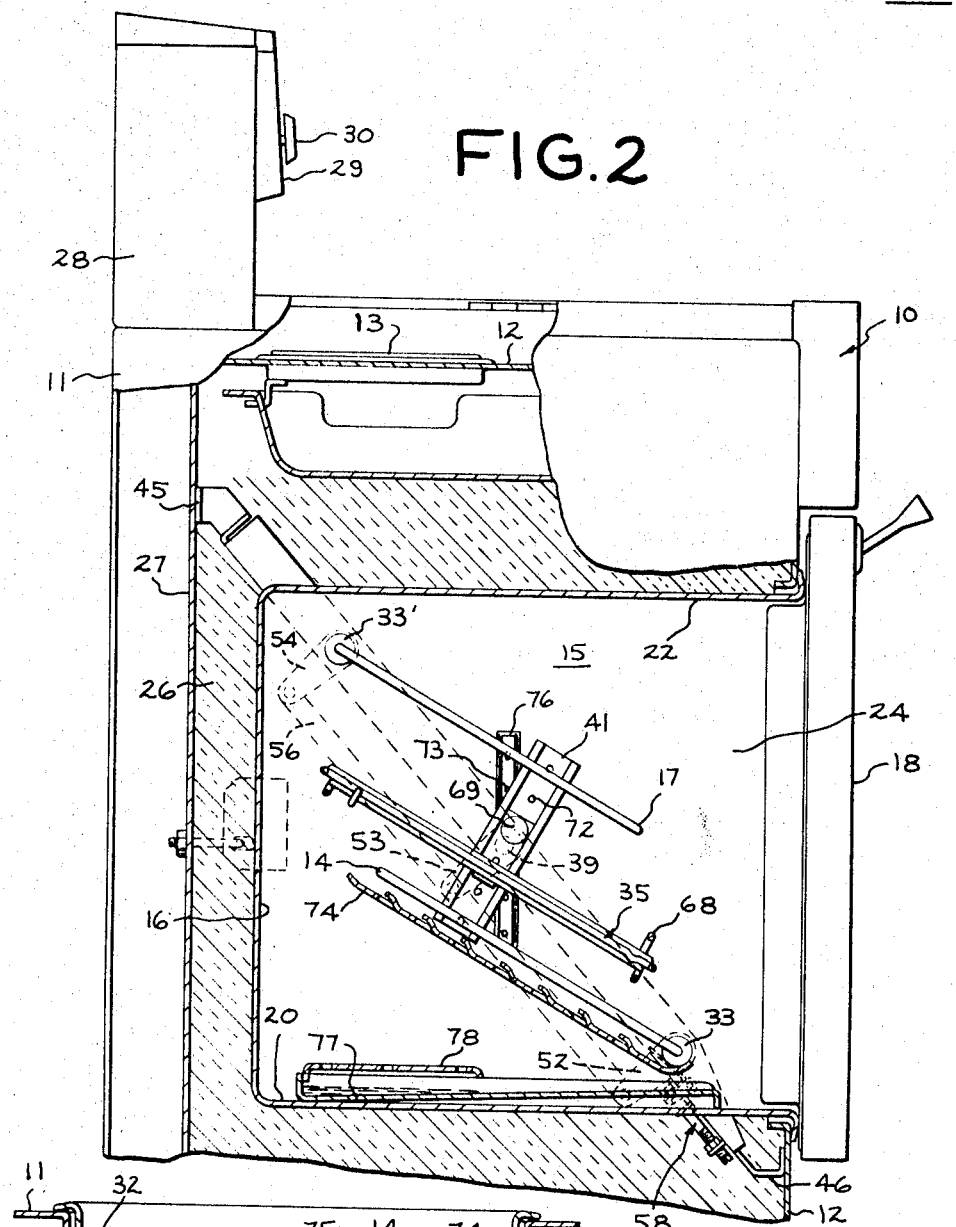

United States Patent Office 3,450,861
Patented June 17, 1969

3,450,861
BROILING OVEN WITH TILTING HEATING MEANS
Bohdan Hurko, Louisville, Ky., assignor to General Electric Company, a corporation of New York
Filed Sept. 21, 1967, Ser. No. 669,619
Int. Cl. F27d 11/00; A21b 1/22
U.S. Cl. 219—404                                    11 Claims

ABSTRACT OF THE DISCLOSURE

A broiling oven having walls forming an oven cooking cavity. An oven rack is arranged intermediate an upper broiling element and a lower baking element. Both the two elements and the oven rack are pivotally mounted from the oven walls such that the two elements may be tilted toward each other to decrease the distance separating them and obtain two-sided, speed broiling. The rack is moved to follow suit so as to remain generally parallel to the two elements for obtaining uniformity of cooking over the surface of the meat. An external linkage mechanism is connected between the three pivoted units so that they move in unison. A snubber is incorporated in the mechanism to prevent the inadvertent movement of the units. Moreover, the oven rack is provided with vertical adjustability with respect to the upper and lower elements to accommodate various thicknesses of meat. A reflecting shield of minimal surface area is carried under the lower baking element for reflecting the heat of the lower baking element away from the bottom wall of the oven to reduce the amount of smoke generated. A grease drain pan is located on the floor of the oven and it has a sloping bottom wall which carries the grease toward the back of the oven cavity.

Cross-reference to related patents

The present invention is an improvement over the tiltable heating elements for a broiling oven as is taught in the patent of F. E. Mergen No. 2,848,592, which is assigned to the General Electric Company, the assignee of the present invention. In the Mergen invention, the heating units may be tilted but the oven rack remains stationary in the various modifications of the invention.

Background of the invention

This invention is related to domestic ovens and particularly electric broiling ovens having at least two resistance type heating elements disposed respectively at the top and bottom of the oven cavity as in standard electric oven designs. For baking, it is the usual practice to energize only the bottom unit or alternatively to energize the bottom unit at full wattage and the upper unit at reduced wattage. For broiling, which includes cooking by rotisserie methods, usually only the upper unit is energized at full wattage. Electric ovens embodying these conventional arrangements have produced very satisfactory cooking results for many years. However, even with the increased wattages used in such ovens at the present time, the time necessary to obtain the desired condition of "doneness" in a broiling operation remains unduly long. In broiling, which is performed largely by radiant heat, the distance from the radiant source to the meat is, of course, an important factor in the speed of broiling.

Admittedly, the speed of broiling can be increased if two sources of radiant heat are provided so that both sides of the meat can be broiled at the same time. It is not only well to provide heat at both sides of the meat but it is also important to be able to vary the spacing of the heaters near the meat; especially if the meat is to be cooked rare; that is, brown on the outside and red on the inside.

The principal object of the present invention is to provide a broiling oven with pivoted heating elements and oven rack which may be manually adjusted in close proximity to each other for obtaining two-sided, speed broiling and eliminating the need for turning the meat.

A further object of the present invention is to provide a broiling oven where the two heating elements and the oven rack are interconnected such that they may be pivoted in unison either toward or away from each other for changing the relative spacing between the oven rack and the heating elements and obtaining two-sided, speed broiling; and this adjustment can be made while the broiling is taking place.

A further object of the present invention is to provide a rack design which holds the meat at a tilted position to provide drainage of grease and juices from the meat surface and less spattering and smoking and better browning.

A further object of the present invention is to provide a broiling oven of the class described where the relative elevation of the oven rack may be adjusted with respect to the two heating elements.

A still further object of the present invention is to provide a broiling oven of the class described where the lower bake element is furnished with an underlying reflector of reduced surface area, so that grease is collected within the bottom of the oven cavity toward the rear thereof in such a way as to discourage the generation of smoke and flames while obtaining improved browning action.

Summary of the invention

The present invention, in accordance with one form thereof, relates to a broiling oven having an oven cavity provided with a pivoted lower heating means and a pivoted upper heating means as well as pivoted intermediate oven rack. The two heating means may be pivoted toward each other into close, spaced relation, and the intermediate rack may also be pivoted to remain generally parallel to the two heating means for obtaining two-sided, speed broiling at variable distances separating the two heating means depending upon the desired degree of doneness of the meat from rare to well done.

Brief description of the drawing

My invention will be better understood from the following description taken in conjunction with the accompanying drawings, and its scope will be pointed out in the appended claims.

FIGURE 2 is a left-side elevational view similar to that of FIGURE 1, on a slightly enlarged scale, showing both the two heating elements of the oven and the oven rack pivoted into an inclined broiling position but generally parallel to each other to obtain two-sided, speed broiling.

FIGURE 3 is a cross-sectional plan view of the lower portion of the oven liner showing the baking element with its underlying reflector of reduced surface area as well as the grease drain pan and partial cover.

Description of the preferred embodiment

Figure 1:
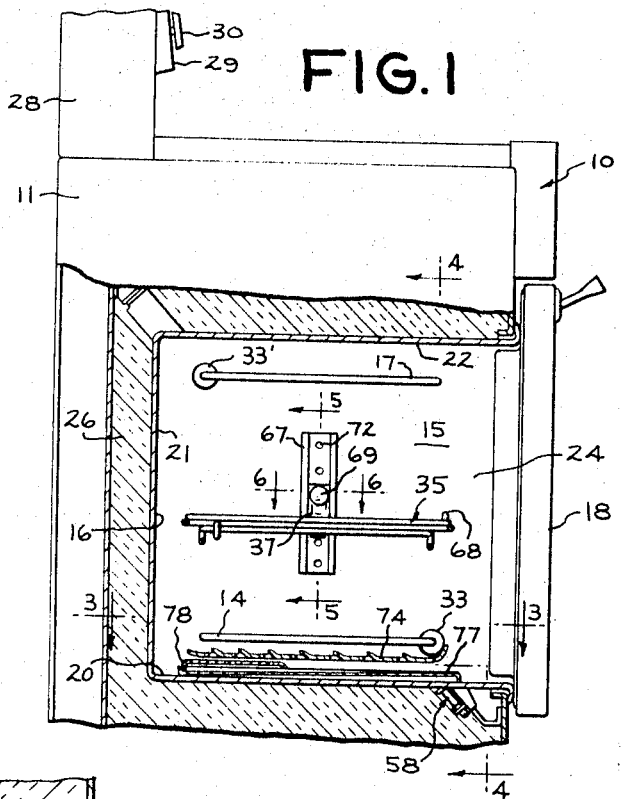
FIGURE 1 is a fragmentary left-side elevational view of an electric range having a baking and broiling oven embodying the present invention with some parts broken away and others in cross-section to show the principal features.

Turning now to a consideration of the drawings and in particular to FIGURE 1 there is shown for illustrative purposes a free-standing electric range 10 having a conventional body construction in which a cabinet 11 has a top cooking surface 12 with a plurality of surface heating elements 13. The range cabinet further includes an oven cavity 15 formed by a box-like oven liner 16 and a front-opening drop door 18. The oven liner has a bottom wall 20, back wall 21, top wall 22 and opposite side walls 24. A thick layer of thermal insulating material 26 such as Fiberglas or the like surrounds the outside of the oven liner to retain the heat generated therein. An insulation guard 27 surrounds the insulation and serves as a supporting means. The back edge of the cooktop 12 supports a backsplasher 28 having a control panel 29 carried thereby with the necessary control components 30 for both the surface heating elements 13 and a pair of oven heating elements 14 and 17. Both the lower bake element 14 and the upper broil element 17 are metal sheathed resistance heating elements of looped configuration as can be envisioned in the plan view of the bake element 14 in FIGURE 3. The terminals of the heating element 14 are brought together as at 32 so that they may extend through a rotatable bushing 33 formed in the lower front corner of the right side wall 24 of the oven liner 16. This bushing 33 serves as a pivotal support means for the bake element 14, and there is a comparable bushing 33' for the broil element 17 in the upper rear corner of the same side wall 24 as is seen in FIGURE 2. Hence, both the bake element 14 and the broil element 17 are pivotally mounted within the oven cavity, and both pivot means are located in the same side wall 24 of the oven liner 16.

Figure 5:
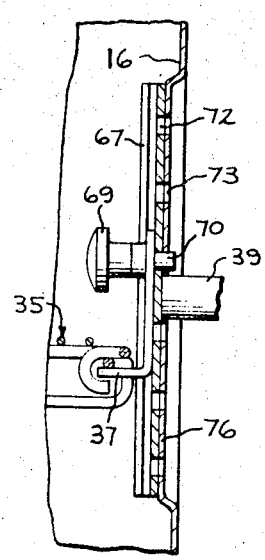
FIGURE 5 is a fragmentary cross-sectional elevational view on an enlarged scale taken on the lines 5—5 of FIGURE 1 and showing the right side of the oven rack and the adjustable support mechanism for changing the elevation of the rack as well as providing the pivotal action.

Intermediate the two oven heating elements 14 and 17 is located an oven rack 35 of welded wire construction which is adapted to be supported from the opposite side walls 24, 24 of the oven liner by means of an angle bracket 37 at each side as is best seen in FIGURE 5. The angle bracket 37 is pivotally connected to the side wall 24 by means of a trunnion 39 which is joined to angle bracket 37 through the medium of a channel-shaped guide member 41. Notice that the trunnion 39 of the oven rack 35 is located in an imaginary line drawn between the centers of the bushings 33 and 33' of the oven heating elements 14 and 17 respectively as is best seen in FIGURE 2.

Figure 4:
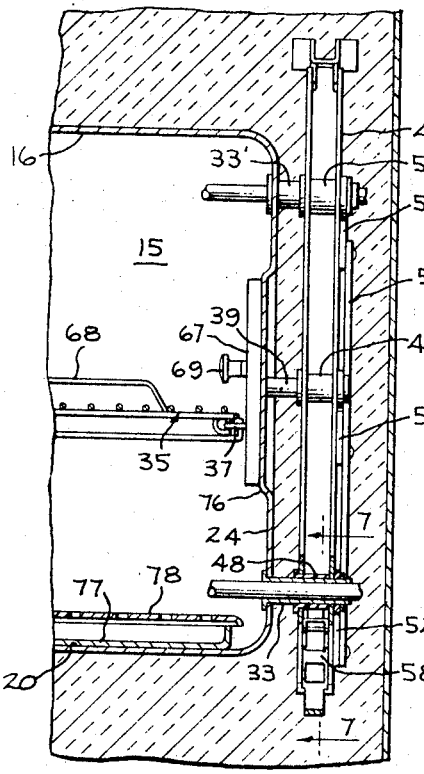
FIGURE 4 is a fragmentary cross-sectional elevational view taken on the lines 4—4 of FIGURE 1 at the right side of the oven and showing the external linkage mechanism interconnecting the two pivoted heating elements with the pivoted oven rack.

Arranged at an inclined angle beside the right side wall 24 of the oven liner 16 as seen in FIGURE 4 is a heavy channel member 43 which serves as a supporting means for a linkage mechanism connecting the two oven heating elements 14 and 17 and the oven rack 35. The channel 43 is itself supported from the range body, as is best seen in FIGURE 2, at the upper end of the insulation guard 27 as at 45, and at the lower portion of the front wall of the range body 11 as at 46. Suitable bearings 48, 49 and 50 are formed in the supporting channel 43 to receive the bake element bushing 33, the trunnion 39 and the broil element bushing 33', respectively. A crank arm is adapted to be fixed to each of the three pivoted units; namely, the bake element bushing 33, the trunnion 39 of the oven rack 35 and the broil element bushing 33'. These crank arms are shown in dotted lines in FIGURE 2 as elements 52, 53 and 54 respectively. These crank arms are adapted to be joined together by a connecting rod 56 with pivotal connectors such that the three units 14, 17 and 35 are caused to move in unison when one of the units is repositioned.

In use, the housewife would probably grasp the front edge of the oven rack 35 as shown in FIGURE 1 with one hand and tilt the rack down in the front and in so doing the broil element 17 would also tilt down at the front and the bake element 14 would tilt up at the back, all as shown in FIGURE 2. A modification would be to provide a hand lever (not shown) at the right top side of the oven that is connected to the linkage mechanism and accessible from the front of the range body so that a shifting movement of the hand lever in either a forward or reverse direction would swing the linkage mechanism and tilt the three pivoted units 14, 37 and 17.

Figure 7:
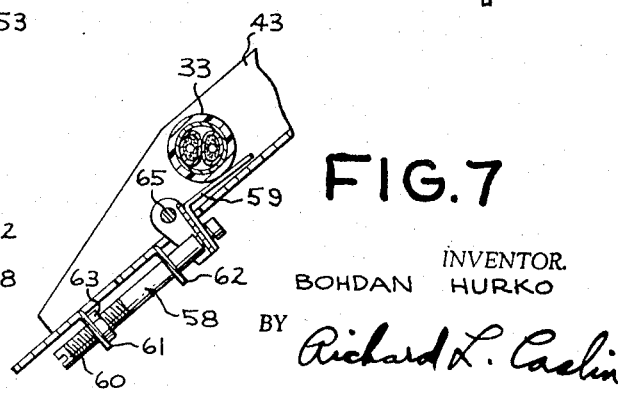
FIGURE 7 is a fragmentary cross-sectional elevational view taken on the lines 7—7 of FIGURE 4 showing the snubber acting upon the bake element bushing so as to retard the pivotal movement of the three pivoted units.

It is well to provide a snubber 58 shown in cooperation with the bake element bushing 33 in FIGURE 2 for retarding the pivotal movement of the bake element and hence of the linkage mechanism for both the bake element 14, the broil element 17 and the oven rack 35. A more detailed showing of this snubber 58 is shown in FIGURE 7 and it comprises a pivotal friction member 59 and an adjusting bolt 60 such that the bolt varies the pressure exerted by the friction member against the bake element bushing 33. This snubber 58 is mounted to the supporting channel 43. Several lancings 61 and 62 are formed out of the base of the channel member 43 for receiving the bolt member 60 through suitable threaded openings therein. A lock nut 63 is threaded onto the bolt 60 and may be adjusted against one of the lancings 61 to lock the bolt in place. The friction member 59 is pivotally supported by means of a hinge pin 65 that extends through suitable aligned openings in the side walls of the channel member 43.

Figure 6:
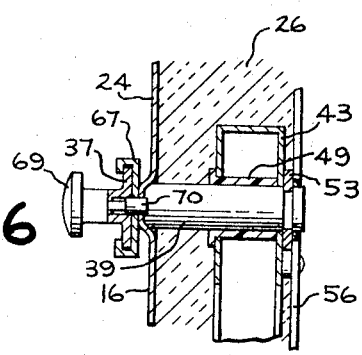
FIGURE 6 is a fragmentary cross-sectional plan view taken on the lines 6—6 of FIGURE 1 and showing more of the details of the vertical and pivotal adjustment means of the oven rack.

It is important to be able to adjust the elevation of the oven rack 35 within the oven cavity especially during normal baking operations when the food supporting rack is in a horizontal position. In a standard oven design this is possible because of a series of vertically spaced ledges or embossments on the opposite side walls of the oven liner so that the rack may be placed at different levels within the oven relative to the top and bottom heating means. In the present invention it might be desirable to locate the oven rack 35 closer to one or the other of the oven elements depending upon the wattage rating of the element and its rate of heating in order to obtain desirable browning. Looking at FIGURES 5 and 6 of the drawing, the angle bracket 37 on which each side of the oven rack 35 is supported is not fixed to the trunnion 39 but instead is slidably received within a guide member 67 as is best seen in FIGURE 6. The position of the angle bracket 37 is held with respect to the guide member, once the proper elevation is obtained, by a movable plunger 69 which may either be spring biased or a threaded member for moving a locking pin 70 into cooperation with one of a plurality of vertically spaced indexing holes 72 which are formed in the guide member 67 as well as aligned holes 73 in a vertical embossment 76 in the side wall 24 of the oven liner 16. Thus, the angle bracket 37 is capable of moving within the guide member 67 and its position may be held by operating the plunger 69 with its locking pin 70 in the various openings 72 and 73. This will lock the angle bracket 37 in preselected horizontal positions. When the position of the oven rack 35 is to be changed to an inclined broil position, the locking pin 70 must be disengaged from its mating hole 73 in the oven liner while remaining engaged in one of the holes 72 of the guide member 67, thus permitting a free pivotal movement of the oven rack and the two heating elements. It will be understood that both sides of the oven rack 35 are furnished with this adjustable supporting means that is shown in detail in FIGURES 5 and 6. Hence, it would require two hands in order to manipulate the plungers 69 in order to change the height of the oven rack 35.

The oven rack 35 itself is of rather standard construction in that it is of a generally telescopic design having a fixed lower section and a slidably movable upper section. Thus when the housewife wants to load or unload the rack she will grasp the front edge of the top section of the oven rack and pull it forward while the lower portion of the rack remains stationary. It is possible to remove the food by merely sliding the rack out through the door opening. Notice that the front edge of the upper section of the oven rack 35 has a raised rail 68 so that when the rack 35 is titlted at a 20 to 30 degree angle the meat will not be able to slide off the rack. Also this rail 72 serves as a handle for manipulating the sliding upper section of the rack.

With the present invention the radiant heaters can be brought as close to the meat as the housewife wishes without touching the meat or a broil pan. It is expected that the meat would be placed directly on the oven rack 35 to take full advantage of the two-sided broiling action. Moreover, the spacing can be adjusted during broiling if the housewife wishes in order to adjust the setting. Since the meat can be broiled at a slanted position there is drainage of grease and watery meat juices to provide better browning and less smoke because the grease would drain along the rods of the oven rack and fall off the front edge thereof.

Fastened to the underside of the bake element 14 is a reflector pan 74 of reduced surface area due to the fact that large holes 75 are cut in the pan so that the remaining section of the reflector generally follows the trace of the looped configuration of the bake element 14. During two-sided, speed broiling both the bake unit 14 and the broil unit 17 are energized so that the heating rate is much faster than ordinary one sided broiling and this would tend to increase smoke and fire hazards unless some provision were made. First, there is a grease collecting pan 77 positioned on the bottom wall 20 of the oven liner and it has a downwardly and rearwardly sloping bottom wall so that the major portion of the grease is collected toward the rear of the oven cavity which would be spaced at a greater distance from the bake element 14 in its broiling position as seen in FIGURE 2. Another modification would be to provide a perforated reflective cover 78 over the back side of the grease collecting pan 77 to protect the grease against the radiant heat of the broil element 17. The perforations of the cover 78 serve to prevent grease from collecting in a pool on the top thereof. A modification would be to incline the top surface of the cover 78 forwardly so the grease falling thereon would drain into the collecting pan 77. The reflector pan 74 effectively directs the radiant heat from the bake element 14 toward the meat on the oven rack 35. It has been discovered that smoke is not produced when the grease drops directly on the bake unit 14 but rather smoke and spattering occurs when small droplets of grease hit the hot reflector pan. Hence in order to reduce the smoke the heat from the bake unit 14 is reflected away from the bottom wall 20 of the oven liner and at the same time the surface area of the reflector pan is reduced so that some of the grease fails therethrough. This tends to prevent ignition in the grease pan 77. Lancings 80 are formed in the reflector pan 77 beneath the bake element 14, again for reducing the surface area of the pan.

Modifications of this invention will occur to those skilled in this art. Therefore it is to be understood that this invention is not limited to the particular embodiments disclosed but that it is intended to cover all modifications which are within the true spirit and scope of the invention as claimed.

What I claim as new and desire to secure by Letters Patent of the United States is:

1. A broiling oven comprising walls forming an oven cavity, a pivoted lower heating means, a pivoted upper heating means, and a pivoted intermediate oven rack all supported within the oven, whereby the two heating means may be pivoted toward each other in close spaced parallel relation and the intermediate rack may also be pivoted to be generally parallel to the said two heating means for obtaining two-sided, speed broiling at variable distances separating the two heating means, the two heating means and the intermediate oven rack all have hinge portions extending through at least one side wall of the oven, a linkage mechanism located outside said one wall and joining the hinge portions of the two heating means with the hinge portion of the oven rack such that the three pivoted units are caused to move in unison, and restraining means acting upon the mechanism for preventing the inadvertent movement thereof.

2. A broiling oven as recited in claim 1 wherein the lower heating means is a metal sheathed resistance heating element of serpentine looped form having two terminal ends arranged on a pivotal axis that extends transversely of the oven, and a reflecting shield of reduced surface area joined to the lower heating element on the underside thereof and generally following the trace of the serpentine looped form for reflecting the heat of the lower heating element away from the bottom wall of the oven.

3. A broiling oven as recited in claim 2 where there is a grease draining pan positioned on the bottom wall of the oven, said pan having a sloping bottom wall directed down toward the rear of the oven, the said lower heating element being pivoted on an axis positioned near the front of the oven, the upper heating element being pivoted on an axis positioned near the rear of the oven so that upon the elements being tilted the lower element is raised at the rear and the upper element is lowered at its front edge.

4. A broiling oven as recited in claim 1 wherein the lower and upper heating means are each pivotally mounted from the walls of the oven at ends opposite from each other.

5. A broiling oven having a box-like oven liner and an access door, electric resistance heating means for the oven including a lower baking element and an upper broiling element, an oven rack supported intermediate the heating elements, the upper element being supported from at least one of the side walls of the oven liner about a pivotal axis at the rear of the oven, the lower element being supported from at least one of the side walls of the oven liner about a pivotal axis at the front of the oven, the oven rack being supported from the opposite side walls of the oven liner about a generally central pivotal axis that lies within an imaginary line drawn between the pivotal axes of the upper and lower heating elements, and linkage means outside of the oven liner for interconnecting the three pivotal members in an assembly so that when tilted the members move in unison, and restraining means acting upon the assembly for preventing the inadvertent movement thereof.

6. A broiling oven as recited in claim 5 wherein the oven rack includes a pair of trunnions adjacent the center and at the two opposite sides thereof, and a vertical adjusting means connecting each side of the oven rack to the adjacent trunnion so as to be able to vary the relation elevation of the oven rack with respect to the top and bottom heating elements.

7. A broiling oven as recited in claim 6 wherein the lower heating element is of serpentine looped form and includes a reflecting shield carried thereunder, said shield being of minimal surface area generally following the trace of the heating element for reflecting the heat of the lower heating element away from the bottom wall of the oven.

8. A baking and broiling oven having walls forming an oven cooking cavity, a lower bake element, an upper broil element, and an oven rack intermediate the two heating elements, the two heating elements and the oven rack being pivotally supported about transverse axes from at least one side wall of the oven, said transverse pivotal axis of the upper element being adjacent the rear of the cooking cavity, while the pivotal axis of the lower element is adjacent the front of the cooking cavity and the pivotal axis of the rack is adjacent the center of the cooking cavity, where all three pivotal axes lie substantially in a common plane, and a linkage mechanism external of the oven walls and interconnecting the three pivoted units so that the movement of one unit causes the other units to move in unison.

9. A baking and broiling oven as recited in claim 8 wherein an underlying reflector of reduced surface area is connected to the bake element, and a grease collecting pan positioned on the floor of the oven cavity, said grease pan having a downwardly and rearwardly sloping bottom wall so that the grease collects adjacent the back of the oven.

10. A baking and broiling oven as recited in claim 9 with the addition of a snubber acting on the three pivoted units to prevent the inadvertent movement of the units.

11. A baking and broiling oven as recited in claim 10 wherein the oven rack is vertically adjustable with respect to its supporting trunnions and the two heating elements.

References Cited

UNITED STATES PATENTS

| | | | |
|---|---|---|---|
| 1,954,894 | 4/1934 | Shenton | 99—391 X |
| 3,024,346 | 3/1962 | Sand | 219—404 |
| 3,031,948 | 5/1962 | Lotter | 99—390 |
| 3,177,342 | 4/1965 | Wickenberg | 219—404 X |
| 2,918,560 | 12/1959 | Kruse | 219—404 |
| 3,281,575 | 10/1966 | Ferguson | 219—404 |

BERNARD A. GILHEANY, *Primary Examiner.*

H. B. GILSON, *Assistant Examiner.*

U.S. Cl. X.R.

99—391